United States Patent
Nenov

(10) Patent No.: US 10,225,234 B2
(45) Date of Patent: Mar. 5, 2019

(54) SYSTEMS AND METHODS FOR GEOPROCESSING-BASED COMPUTING NETWORK SECURITY

(71) Applicant: Fortress Information Security, Orlando, FL (US)

(72) Inventor: Dejan Nenov, Boise, ID (US)

(73) Assignee: Fortress Cyber Security, LLC, Orlando, FL (US)

( * ) Notice: Subject to any disclaimer, the term of this patent is extended or adjusted under 35 U.S.C. 154(b) by 184 days.

(21) Appl. No.: 15/253,531

(22) Filed: Aug. 31, 2016

(65) Prior Publication Data
US 2018/0063082 A1 Mar. 1, 2018

(51) Int. Cl.
*H04L 29/06* (2006.01)
*H04L 29/08* (2006.01)

(52) U.S. Cl.
CPC ........ *H04L 63/0236* (2013.01); *H04L 63/107* (2013.01); *H04L 67/18* (2013.01); *H04L 63/0263* (2013.01)

(58) Field of Classification Search
CPC ............. H04L 63/0236; H04L 63/0245; H04L 63/0227; H04L 63/107; H04L 63/20
See application file for complete search history.

(56) References Cited

U.S. PATENT DOCUMENTS

| 2003/0149888 | A1* | 8/2003 | Yadav | H04L 63/1408 726/23 |
| 2009/0016236 | A1* | 1/2009 | Alcala | H04L 43/022 370/253 |
| 2013/0007257 | A1* | 1/2013 | Ramaraj | H04L 63/0263 709/224 |
| 2014/0143854 | A1* | 5/2014 | Lopez | H04L 63/0218 726/14 |

* cited by examiner

*Primary Examiner* — Robert B Leung
*Assistant Examiner* — Carlos M De Jesus Lassala
(74) *Attorney, Agent, or Firm* — Foley & Lardner LLP

(57) ABSTRACT

The present disclosure describes systems and methods for geoprocessing-based packet processing and network security. Filter parameters, such as Internet Protocol (IP) addresses or other such information, may be used to define one or more minimum bounding rectangles (MBR). Parameters of an incoming packet may be compared to the MBR data using spatial algorithms, such as a coordinate search within an R-tree data structure. The identified MBRs within the tree may be used to apply corresponding filtering and/or forwarding rules to the packet. This may significantly accelerate rule searching and matching algorithms, reducing delays and computing resource requirements and accelerating network security processing.

16 Claims, 7 Drawing Sheets

SYSTEMS AND METHODS FOR GEOPROCESSING-BASED COMPUTING NETWORK SECURITY

FIELD

The present application relates to systems and methods for network security and packet processing using geoprocessing.

BACKGROUND

Network security frequently requires packet inspection and filtering, including applying blocking, forwarding, or redirection rules to incoming packets. These rules may be quite complex, based on a combination of information from one or more layers of the packet. As rules databases get large, particularly for whitelist or blacklist-based blocking, it may take significant time to compare the packet information to each rule within the database, resulting in delays and inefficiencies within the system.

SUMMARY

The present disclosure describes systems and methods for geo-spatial-processing-based packet processing and network security. Filter parameters, such as Internet Protocol (IP) addresses or other such information, may be used as dimensions to define one or more minimum bounding rectangles (MBR). Parameters of an incoming packet may be compared to the MBR data using spatial algorithms, such as a coordinate search within an R-tree data structure. The identified MBRs within the tree may be used to apply corresponding filtering and/or forwarding rules to the packet. This may significantly accelerate rule searching and matching algorithms, reducing delays and computing resource requirements and accelerating network security processing.

BRIEF DESCRIPTION OF THE FIGURES

In the drawings, like reference numbers generally indicate identical, functionally similar, and/or structurally similar elements.

DETAILED DESCRIPTION

The following description in conjunction with the above-referenced drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

Network security frequently requires packet inspection and filtering, including applying blocking, forwarding, or redirection rules to incoming packets. For example, an administrator may wish to block packets having particular source internet protocol (IP) addresses or destination addresses, or packets associated with particular protocols, applications or ports; may wish to forward other packets to predetermined destinations based on these parameters regardless of a destination included in the packet; or may wish to modify packets based on these parameters.

Figure 1A:
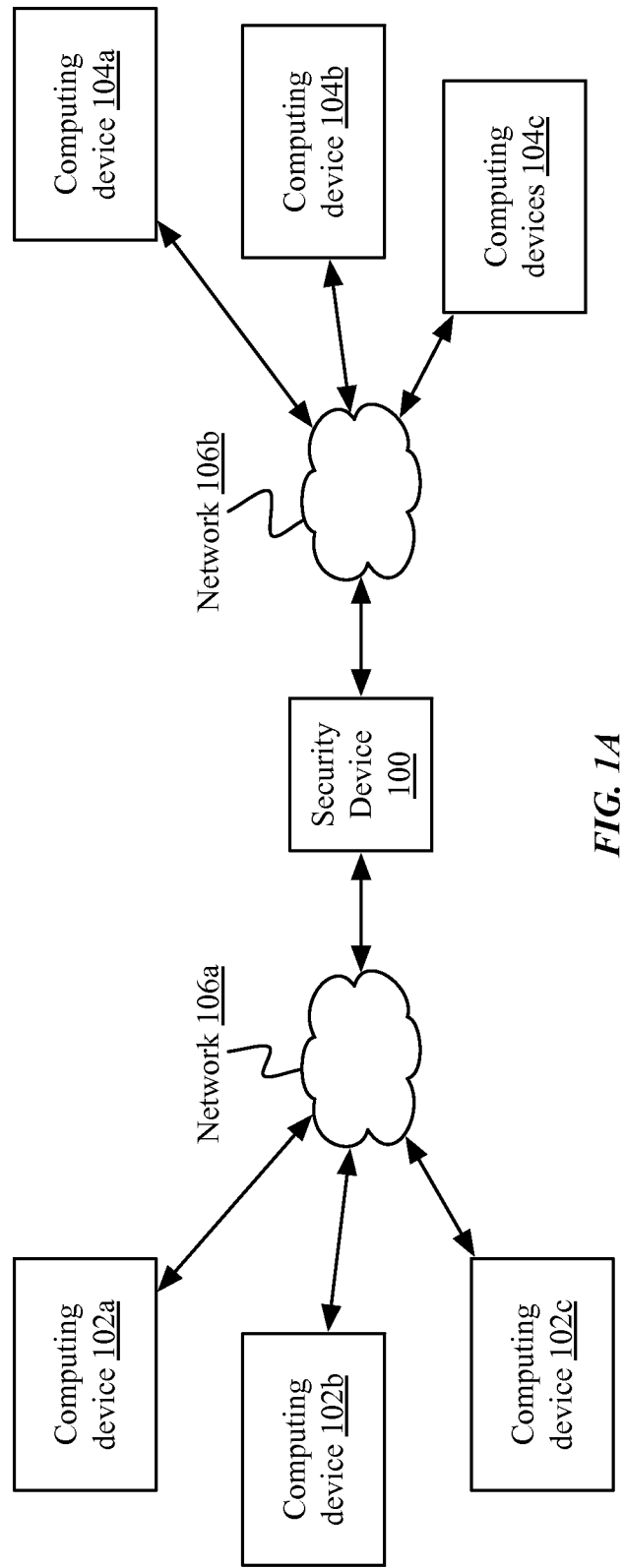
FIG. 1A is a block diagram of an embodiment of a computing environment for providing geoprocessing-based packet processing and network security.

For example, referring first to FIG. 1A, illustrated is a computing environment comprising a security device 100 deployed as an intermediary between a first one or more computing devices 102a-102c (referred to generally as client devices, clients, server devices, servers, host devices, hosts, or computing devices 102), and a second one or more computing devices 104a-104c (referred to generally as client devices, clients, server devices, servers, host devices, hosts, or computing devices 104), via a plurality of network segments 106a-106b (referred to generally as network segments or networks 106). Security device 100 may comprise a gateway, firewall, switch, hub, access point, modem, or any other such device. Although shown intermediary to networks 106a-106b, in some implementations, security device 100 may be deployed as a sidechain device. Networks 106 may comprise any type and form of network, including a local area network (LAN), wide area network (WAN) such as the Internet, a wireless network, a cellular network, a satellite network, a cable network, or any combination of these or other networks. Additional devices not illustrated may be deployed on networks 106, including switches, gateways, routers, firewalls, or other such devices. Computing devices 102, 104 may comprise any type and form of computing device, including desktop computers, laptop computers, tablet computers, smart phones, smart televisions, game consoles, wearable computers, networked devices or appliances such as Internet of Things (IoT) devices, server computers, workstations, or any other type and form of networked computing device, and may be variously referred to as servers, clients, hosts, remote devices, local devices, or by any other such name.

Security device 100 may receive packets from computing devices 102 and directed to other computing devices 104 (or vice versa), and may, depending on security and filtering rules, forward or retransmit the packet; block or discard the packet; or modify and retransmit the packet (e.g. with network address translation (NAT), payload stripping or encryption to prevent information exfiltration, etc.).

Packet processing or security rules may be quite complex, based on a combination of information from one or more layers of the packet, including internet or network layer addresses, transport layer addresses, session or application layer protocols, payload information, other header information such as quality of service (QoS) requirements or priority, or any other type and form of information. As rules databases get large, particularly for whitelist or blacklist-based blocking, it may take significant time to compare the packet information to each rule within the database, resulting in delays and inefficiencies within the system.

For example, in some implementations, packet processing rules may be stored in a relational database and accessed via structured query language (SQL) requests, or other similar processing or query languages. For example, in one such implementation, a system may include a database with a rule (e.g. a blocking rule to discard or block further transmission of an incoming packet) associated with a range of source IP addresses (e.g. from a starting IP address ip_from to an ending IP address ip_to). Upon receipt of a packet, the system may determine if the source IP address of the packet (e.g. 1.2.3.4) is within the indicated range, such as via a query of the database:

SELECT * from ipranges WHERE INET_ATON
 ('1.2.3.4') BETWEEN ip_from and ip_to;

The SQL database may use a binary search tree, or B-tree index, to search through each of the ip_to and ip_from columns. However, as B-tree searches take O(log n) time on average (in Big O notation), this can take a significant amount of time. For example, given a potential search space in IPv4 of 4,294,967,296 potential addresses (from 0.0.0.0 to 255.255.255.255), a test system may take as much as 1.5 seconds to determine if the address is within a designated range. With IPv6 and a search space of 2^128 addresses, identifying if an address is within a given range may take even longer. Furthermore, as additional filter parameters are added for comparisons, the queries may grow exponentially more complex. For example, determining whether a packet matches a rule specifying a range of source addresses, a second range of destination addresses, a third range of protocol types, a fourth range of payload sizes, and a fifth range of priorities may cause significant latency in processing and forwarding the packet.

Figure 1B:
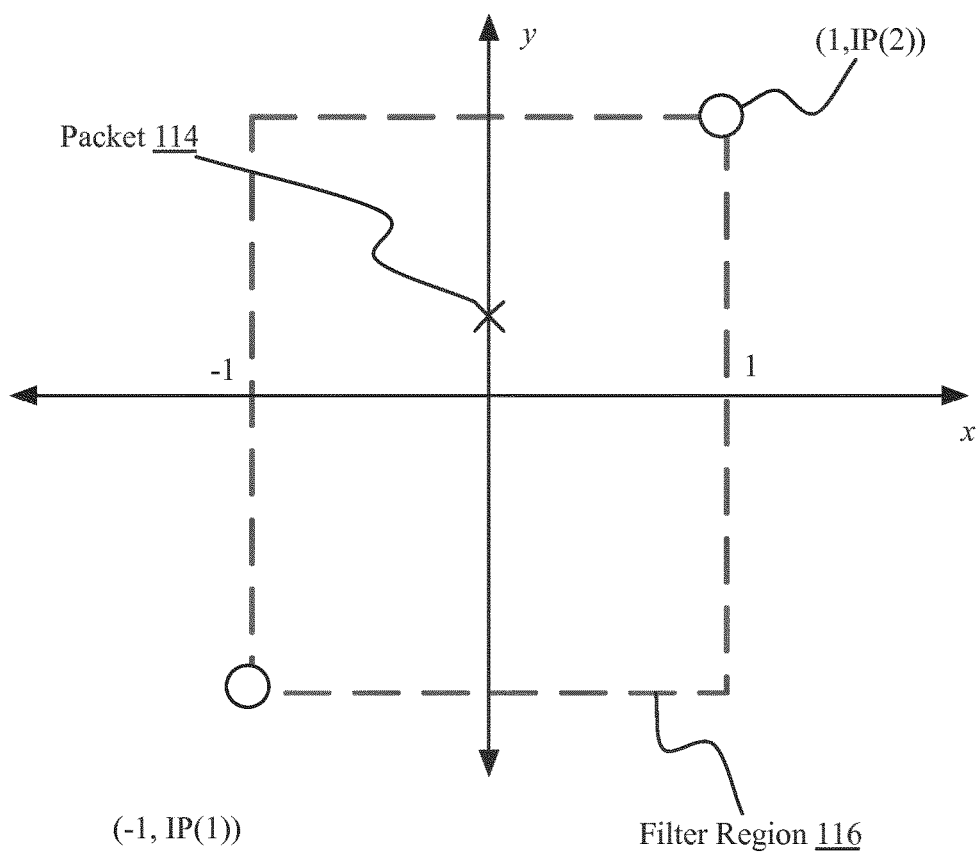
FIG. 1B is an illustration of an embodiment of mapping a packet to a filter region for geoprocessing-based packet processing and network security.

Instead, packet processing and security rules may be applied via geoprocessing-based analysis. Filter parameters, such as IP addresses or other such information, may be used to define one or more minimum bounding rectangles (MBR). For example, and referring briefly to FIG. 1B, illustrated is an embodiment of mapping a packet (e.g. packet 114) to a region (e.g. filter region 116) for geoprocessing-based packet processing and network security. The filter region may represent a range of parameters, such as source IP addresses from a first value IP(1) to a second value IP(2), such as ip_from and ip_to discussed above. A two-dimensional MBR may be defined with diagonally opposite corners based on the ip_from and ip_to values, e.g. from (−1, IP(1)) to (1, IP(2)) as shown. This makes it possible to search for an IP address in a spatial domain (e.g. a point at (0, source IP)), using geoprocessing based algorithms.

For example, parameters of an incoming packet may be compared to the MBR data using spatial algorithms, such as a coordinate search within an R-tree data structure. One example query may be:

SELECT * from ipranges WHERE
 MBRContains(mbr,ST_GeomFromText(CONCAT('Point(0 ',
 INET_NTOA('1.2.3.4'),')')));

Because a spatial domain query is used, the database server may use an R-tree index. Average search time for the space for an R-tree is O(log_M n), which may be significantly faster than the B-tree search discussed above. For example, in a similar test system to that discussed above, the above query executed in 0.05 seconds, a 30-fold reduction in time.

Thus, the identified MBRs within the tree may be used to apply corresponding filtering and/or forwarding rules to the packet. This may significantly accelerate rule searching and matching algorithms, reducing delays and computing resource requirements and accelerating network security processing.

Figure 1C:
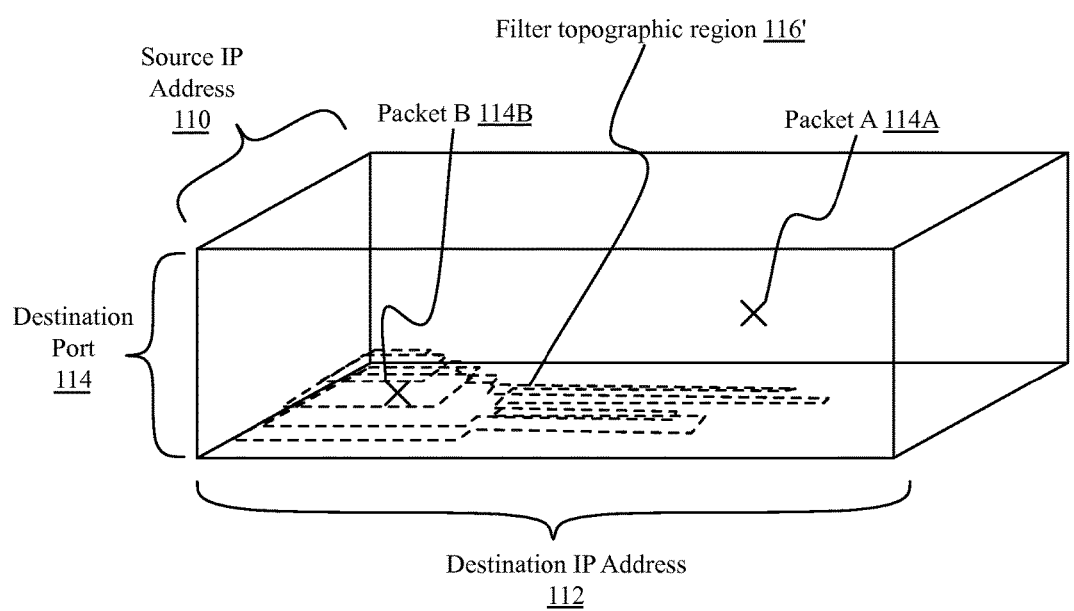
FIG. 1C is an illustration of an embodiment of a multi-dimensional topographic region for geoprocessing-based packet processing and network security.
Figure 1D:
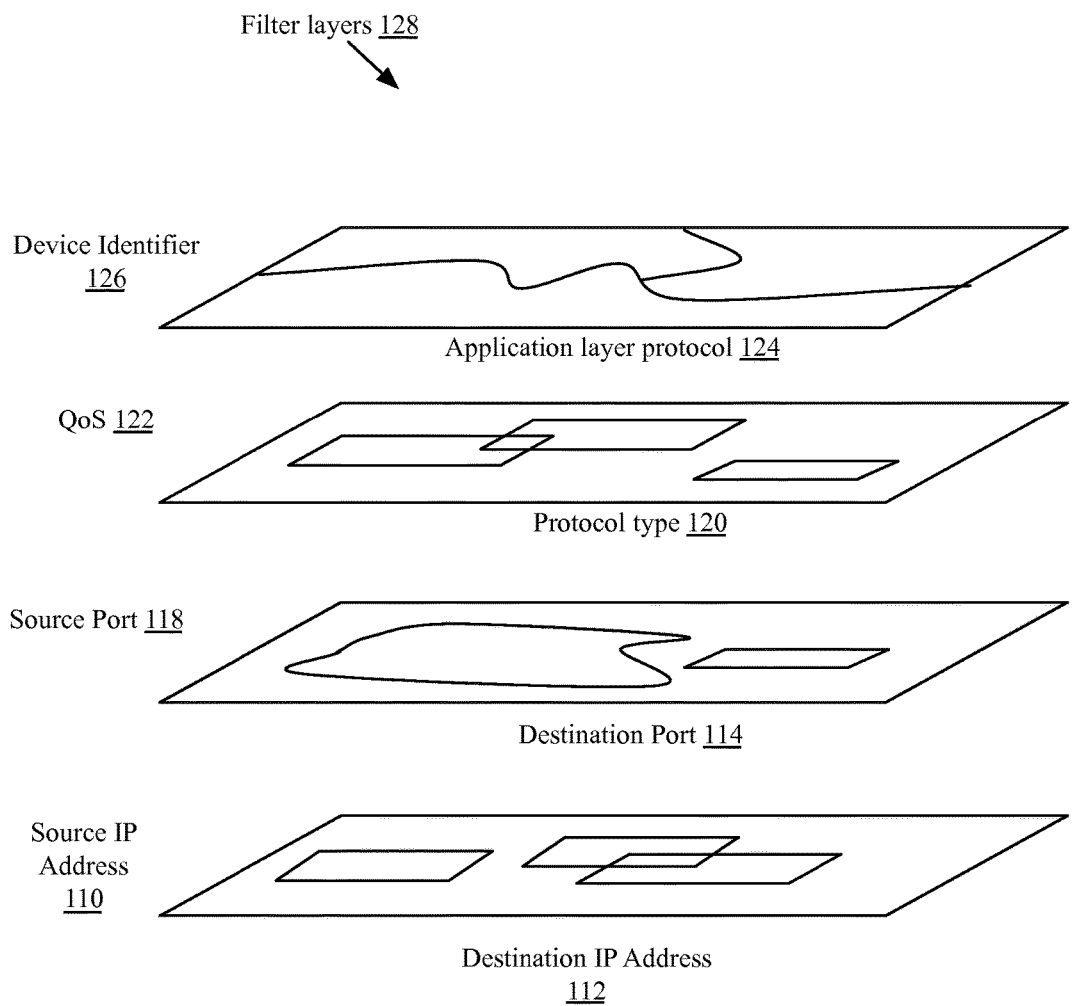
FIG. 1D is another illustration of an embodiment of different filter layers for a multidimensional topographic region for geoprocessing-based packet processing and network security.

Furthermore, multiple filter parameters may be searched and analyzed simultaneously. FIG. 1C is an illustration of an embodiment of a multidimensional topographic region 116' for geoprocessing-based packet processing and network security with boundaries based on source IP address 110, destination IP address 112, and destination port number 114. Three dimensional filter regions may be defined and spatial algorithms used to determine whether a packet falls within the region (e.g. packet B 114B) or outside of the region (e.g. packet A 114A). In another example, FIG. 1D illustrates an embodiment of different filter layers 128 for a multidimensional topographic filter region. One or more filter layers 128 may be applied with different parameters, such as source IP addresses 110, destination IP addresses 112, source ports 118, destination ports 114, QoS requirements 122, protocol types 120, application layer protocol types 124, device identifiers 126, or any combination of these or other parameters. As shown, filter regions may be rectangles, such as MBRs, circles, or may be polygons or function-defined regions, shapes, or lines in various implementations.

Figure 2A:
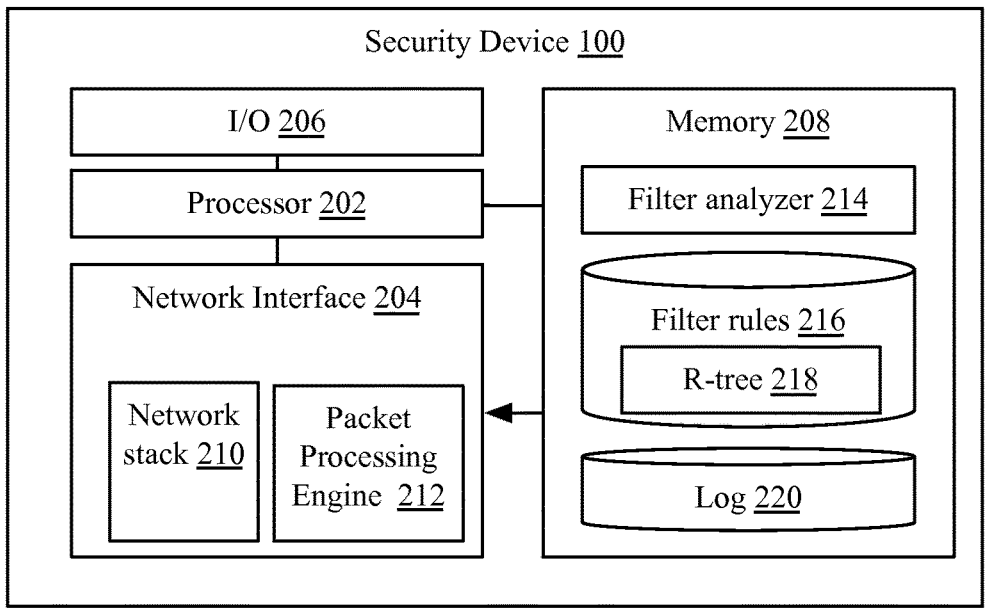
FIGS. 2A-2B are block diagrams of embodiments of a security device and client device, respectively.

FIG. 2A is a block diagram of an embodiment of a security device 100. Security device 100 may comprise a laptop computer, desktop computer, wearable computer, portable computer, smart phone, tablet computer, network camera, or any other type and form of computing device capable of encoding and streaming media. In some implementations, a security device 100 may not include all of elements 202-220 illustrated, or may include a plurality of any of elements 202-220 or other elements. For example, in one implementation, a security device 100 may comprise a plurality of network interfaces 204. Furthermore, although illustrated as a single device, in many implementations as discussed above, a security device 100 may comprise a plurality of security device 100 in communication via a network, such as a separate switch and firewall, or any other combination of these or other devices. In some implementations, a security device 100 may comprise a virtual device or virtual machine, executed by a physical machine.

A security device 100 may include one or more processors 202. A processor 202 may comprise a central processing unit (CPU), microprocessor, application-specific instruction-set (ASIC) processor, or any other type and form of processor for receiving, analyzing, filtering, blocking, modifying, and/or retransmitting packets. A processor 202 may communicate with one or more network interfaces 204, which may comprise any type and form of network interfaces, such as a physical interface (e.g. Ethernet, fiber optic interface, or any other such interface), a wireless interface (e.g. 802.11a, 802.11b, 802.11.g, 802.11n, 802.11ac, Bluetooth, cellular, or any other such interface), or a virtual or abstract interface (e.g. physical transport of storage, or "SneakerNet"), or any other such type and form of interface. Network interfaces 204 may be used for receiving and transmitting packets, as well as performing many types of data extraction and processing on the packets. Network interfaces 204 may communicate with computing devices 102, 104 via a network (not illustrated), which may comprise any type and form of network or networks, including a LAN and/or WAN such as the Internet. For example, in many implementations, a security device 100 may connect to a first LAN, which may connect to the Internet, which may further connect to a second LAN connected to client devices. Accordingly, a network may comprise one or more of a physical network, an Ethernet network, a satellite network, a wireless network, a cellular network, or any other network or combination of networks, and may further comprise one or more devices including gateways, firewalls, network accelerators, proxies, switches, hubs, routers, WiFi access points, load balancers, or any other such devices.

A network interface may include a network stack 210, which may comprise processing and functionality for a plurality of layers of the stack, including a physical layer, network layer, transport layer, session layer, presentation layer, application layer, or any other such layers. The network stack 210 may comprise routines for encapsulating and de-encapsulating headers and payloads of packets at various layers, and may provide functionality for one or more protocols at any layer of the network stack.

A security device 100 may execute a packet processing engine 212, which may be part of the network interface 204 or network stack 210, or may be executed separately by a processor 202. A packet processing engine 212 may comprise an application, service, server, daemon, routine, or other executable logic for processing packets, including performing network address translation, encryption, decryption, compression, decompression, modification of headers or payloads, buffering, caching, pooling, multiplexing, fragmentation or defragmentation, error correction, retransmission handling such as for a lossless protocol, or any other type and form of processing. In some implementations, packet processing engine 212 may extract data or identifiers from a packet for analysis and filtering, such as extracting IP addresses or ports, protocol types, QoS parameters, payload sizes, sequence numbers, or any other type and form of information.

A security device 100 may comprise one or more input/output interfaces 206. An input or output interface 206 may comprise any type and form of interface and/or connected peripherals, such as a video interface and display; a parallel or serial interface, such as a universal serial bus (USB) interface and a mouse or keyboard, or an external serial AT attachment (eSATA) interface and one or more external storage devices; or any other type and form of interface.

A security device 100 may comprise one or more memory devices 208. Memory 208 may comprise any type and form of memory or storage, including random access memory (RAM), hard drive storage, solid state drive storage, flash memory, optical or magneto-optical storage, tape storage, or any other type and form of storage device.

Security device 100 may execute a filter analyzer 214, which may be stored in memory 208 and executed by a processor 202 and/or network interface 204. Filter analyzer 214 may comprise an application, service, server, daemon, routine, or other executable logic for performing queries of a database of filter rules 216, via an R-tree or R*-tree index 218, as discussed above, such as generating and executing SQL queries or queries in a similar database language. As discussed above, in some implementations, a relational database 216 may comprise one or more parameters and associated processing rules, such as source IP address ranges and corresponding blocking rules. Parameters may be any type and form of information extracted from packets as discussed above, and/or may include meta-information about a packet or connection, such as a connection latency, error rate, jitter, bandwidth, or other such information. For example, a filter rule may be configured to block packets to a specified destination IP address if a connection to the destination has a latency within a predetermined range. Processing rules define actions to be performed on matching packets, including blocking or discarding the packet, buffering or delaying the packet, forwarding the packet to a specified destination, transmitting the packet to its identified destination address, and/or modifying one or more headers or payloads of the packet.

In some implementations, a security device 100 may maintain a log 220. Log 220 may comprise a database, flat file, or other type and form of data structure for recording packet parameters and applied filter actions. In some implementations, security device 100 may record actions with timestamps, device identifiers, or other distinguishing information.

Figure 2B:
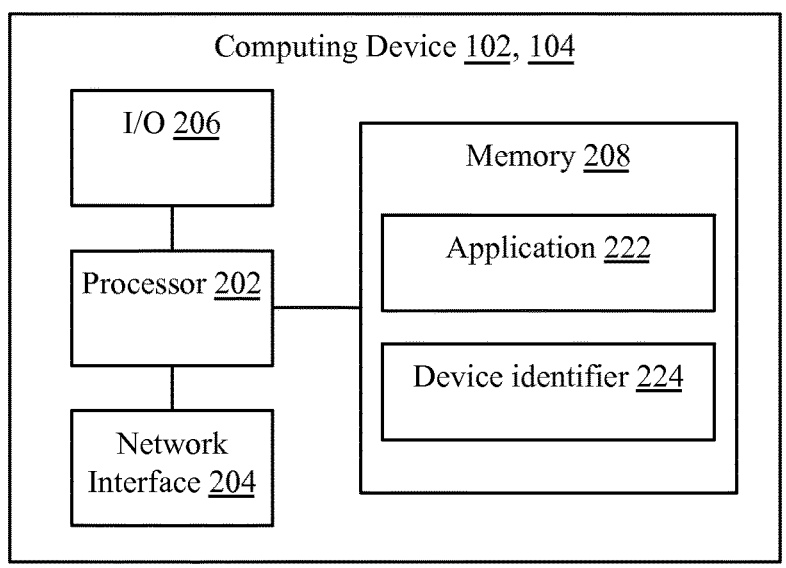

FIG. 2B is a block diagram of an implementation of a computing device 102, 104. As discussed above, computing devices 102, 104 may comprise a laptop computer, desktop computer, tablet computer, wearable computer, smartphone, smart television, set-top box, video game console, or any other type and form of computing device. As with security device 100, the computing devices 102, 104 may comprise one or more processors 202, network interfaces 204, input/output interfaces 206, and memory devices 208. In some implementations, computing device 102, 104 may execute one or more applications 222 for communicating with other computing devices via a network, such as a server, web browser, network application, or other such executable logic. In some implementations, computing devices 102, 104 may be identified by a device identifier 224, which may comprise a media access control (MAC) address, IP address, serial number, globally unique identifier (GUID), device name, user name, account number, or any other type and form of information. Device identifiers 224 may be used as parameters for filtering packets, in some implementations.

Figure 3:
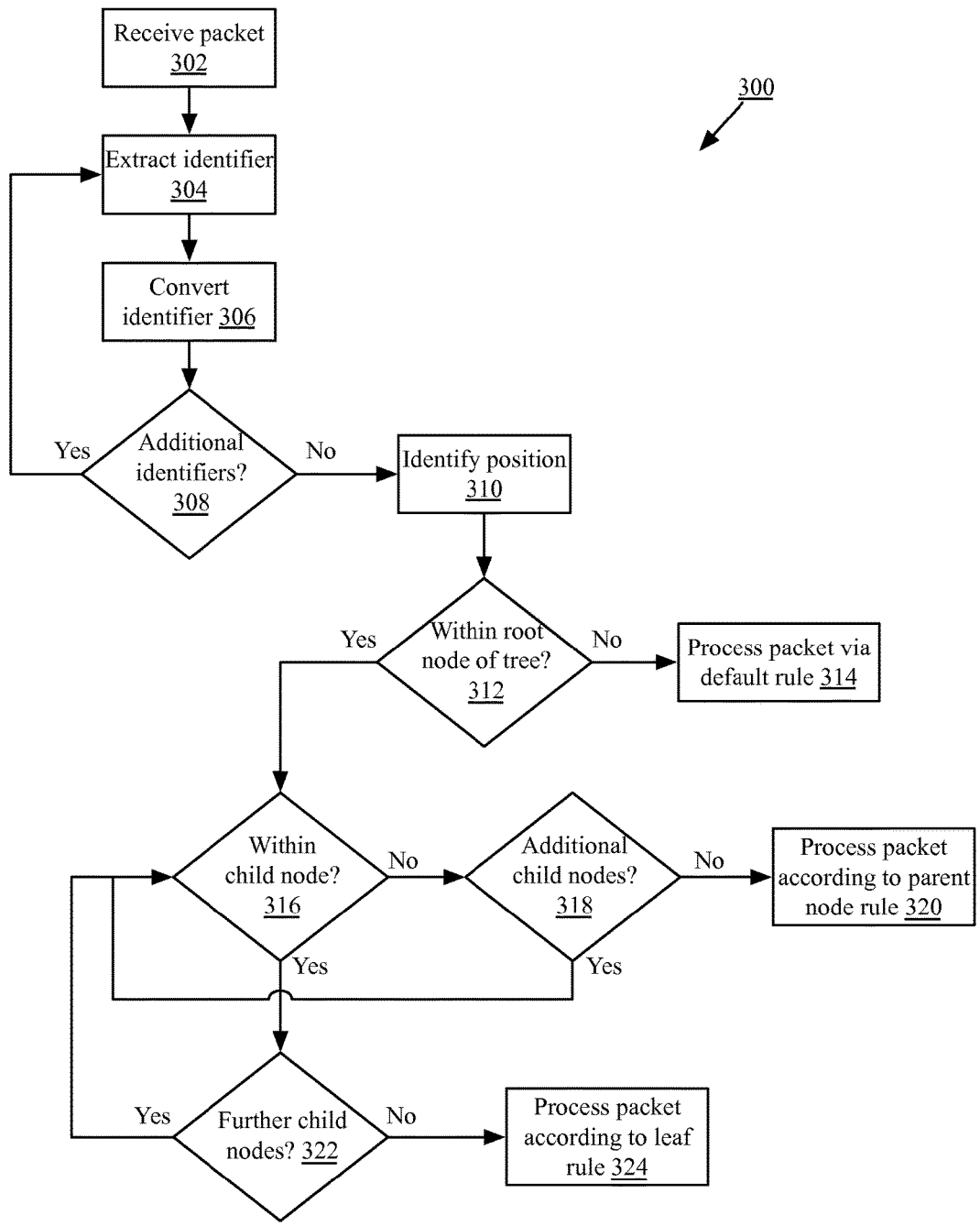
FIG. 3 is a flow chart of an embodiment of a method for geoprocessing-based packet processing.

FIG. 3 is a flow chart of an implementation of a method 300 for geoprocessing-based packet processing. At step 302, a network interface of a security device may receive a packet transmitted from a first computing device and directed to a second computing device, such as a client and server. The packet may be received via any type and form of connection, including a wired connection, wireless connection, or any other type and form of network connection. The packet may be of any type and form, such as a request, response, synchronization packet, acknowledgement packet, remote function call (RFC) or remote procedure call (RPC), or any other type and form of data. In some implementations, packets may be fragmented and may be accumulated and assembled or partially assembled (e.g. assembling just one or more headers of the packet) by the network interface or a packet processing engine prior to analysis and filtering.

At step 304, a packet processing engine of the security device may extract an identifier from the packet. Extracting an identifier may comprise reading a portion of a header or payload of the packet at any protocol layer, such as a source or destination IP address from a network layer of the packet, a transport layer port, and saving the portion to a buffer or data structure for use by a filter analyzer.

In some implementations, at step 306, the extracted identifier may be converted to a value within a predetermined linear range. For example, as discussed above regarding IPv4 addresses, some identifiers have a non-linear format (e.g. [0-255].[0-255].[0-255].[0-255]). These identifiers may be converted to a linear format (e.g. a decimal representation from 0 to 4,294,967,295). Other identifiers may be converted according to a predetermined mapping. For example, a mapping may specify that an IP precedence field may be mapped with best effort equal to 0, priority equal to 1, etc. In another implementation, a mapping may specify that a hypertext transfer protocol (HTTP) is mapped to 10, a secure HTTP protocol is mapped to 11, a file transfer protocol (FTP) is mapped to 12, etc. Accordingly, values for various parameters may be assigned numerical values according to a predetermined mapping or within a predetermined range.

At step 308, if additional identifiers are to be extracted, then steps 304-308 may be repeated iteratively. In some implementations, step 306 may be performed on each identifier after all identifiers have been extracted from the packet.

At step 310, in some implementations, a filter analyzer may identify a spatial position within an n-dimensional space corresponding to the extracted (and converted) values for the identifiers (with n equal to the number of identifiers, in some implementations, or n+1 equal to the number of identifiers, in other implementations as discussed above with destination IP addresses mapped to within a range of (−1, IP(1)) to (1,IP(2)); the additional dimension may be used to generate the MBR with the identified spatial position being centered within the MBR along the additional dimension, e.g. (0, destination IP)). In some implementations, the filter analyzer may generate a point at coordinates of a converted value for a first identifier by a converted value for a second identifier (or, optionally, 0, where only the first identifier is used).

At step 312, the filter analyzer may determine if the identified position is within a root node of an R-tree, with pre-defined regions (e.g. MBRs in many implementations, although circles or other regions may be used in other implementations) corresponding to filter parameters, and associated with a corresponding filter action or processing rule or result. In one such implementation, the filter analyzer may generate a database query comprising an identification of a boundary of the first predefined region and the identified position. If the identified position is not within the root node of the R-tree, then at step 314, the packet may be processed according to a default rule. The default rule may indicate to discard the packet (e.g. in cases of whitelisting), or transmit or forward the packet to its indicated destination (e.g. in cases of blacklisting), or perform other functions on the packet If the identified position is within the root node of the R-tree, then at step 316, the filter analyzer may determine if the position is within a child node of the tree (e.g. an MBR, circle, or other region within the root node). If not, then at step 318, the filter analyzer may determine if additional child nodes exist at the same level of the R-tree. If so, then steps 316-318 may be repeated for each additional child node. If no further child nodes exist, then the packet may be identified as belonging to the root node, but no child node, and at step 320, the packet may be processed according to a processing rule or result corresponding to the root node (e.g. the parent node of the child nodes). In some implementations, only the root node may exist in the tree, while in other implementations, many layers of nodes may exist. The processing rule may include blocking or preventing forwarding of the packet, forwarding or retransmitting the packet, modifying the packet, or any combination of these or other processing steps.

If the position is identified as being within the child node, then at step 322, the filter analyzer may determine if further child nodes exist (e.g. a second layer of child nodes). If so, then steps 316-322 may be repeated iteratively for each further child node. If a position is determined to be within the child node, but not within any further child (e.g. grandchild) node, then at step 320, the packet may be processed according to a rule associated with the child node (e.g. parent of the grandchild node or nodes). Similarly, steps 322 and 316-322 may be repeated for additional layers of children within the R-tree. If no further child nodes exist, then at step 324, the packet may be processed according to a rule associated with the containing child or "leaf" node.

Accordingly, the systems and methods discussed herein provide faster filtering and matching of packets to rules via spatial algorithms. In a first aspect, the present disclosure is directed to a method for geoprocessing-based computing network security. The method includes receiving, by a network interface of a security device deployed as an intermediary between a plurality of computing devices, a packet from a first computing device of the plurality of computing devices directed to a second computing device of the plurality of computing devices. The method also includes extracting, by a packet processing engine of the security device, a plurality of identifiers of the packet. The method further includes identifying, by a filter analyzer of the security device, a position within a spatial map corresponding to a value of the extracted plurality of identifiers, the spatial map comprising at least one predefined region, each predefined region corresponding to a filter condition and result. The method also includes determining, by the filter analyzer, that the identified position is within a first predefined region of the at least one predefined regions; and responsive to the determination, filtering the packet, by the packet processing engine, according to the filter result corresponding to the first predefined region.

In some implementations, the plurality of identifiers comprises a source internet protocol address and a destination internet protocol address. In other implementations, identifying the position within the spatial map corresponding to the value of the extracted plurality of identifiers further comprises, for each of the extracted plurality of identifiers, converting, by the filter analyzer, the value of said extracted identifier to a second value within a predetermined linear range for the identifier. In a further implementation, identifying the position within the spatial map corresponding to the value of the extracted plurality of identifiers further comprises generating a point at coordinates of a converted value for a first identifier of the extracted plurality of identifiers by a converted value for a second identifier of the extracted plurality of identifiers.

In some implementations, the method includes determining that the identified position is within the first predefined region by generating a database query, by the filter analyzer, comprising an identification of a boundary of the first predefined region and the identified position. In a further implementation, the identification of the boundary of the first predefined region comprises a minimum bounding rectangle.

In some implementations, the filter result corresponding to the first predefined region comprises a blocking rule, and filtering the packet comprises preventing forwarding of the packet by the packet processing engine to the second computing device. In other implementations, the filter result corresponding to the first predefined region comprises a redirection rule, and filtering the packet comprises forwarding the packet by the packet processing engine to a third computing device. In still other implementations, the filter result corresponding to the first predefined region comprises a modification rule, and filtering the packet comprises: rewriting, by the packet processing engine, a portion of the packet; and forwarding the packet, by the packet processing engine, to the second computing device.

In another implementation, the method includes receiving, by the network interface of the security device, a second packet from a third computing device of the plurality of computing devices directed to a second computing device of the plurality of computing devices. The method also includes extracting, by the packet processing engine, a second plurality of identifiers of the second packet; and identifying, by the filter analyzer, a second position within the spatial map corresponding to a value of the extracted second plurality of identifiers. The method also includes determining, by the filter analyzer, that the identified second position is external to the at least one predefined regions; and responsive to the determination, forwarding the packet, by the packet processing engine, to the fourth computing device.

In another aspect, the present disclosure is directed to a system for geoprocessing-based computing network security. The system includes a security device deployed as an intermediary between a plurality of computing devices comprising a network interface, a memory device, and a processor executing a packet processing engine and a filter analyzer. The network interface is configured to receive a packet from a first computing device of the plurality of computing devices directed to a second computing device of the plurality of computing devices. The packet processing engine of the security device is configured to extract a plurality of identifiers of the packet. The filter analyzer of the security device is configured to: identify a position within a spatial map stored in the memory device corresponding to a value of the extracted plurality of identifiers, the spatial map comprising at least one predefined region, each predefined region corresponding to a filter condition and result, and determine that the identified position is within a first predefined region of the at least one predefined regions. The packet processing engine is further configured to filter the packet, responsive to the determination, according to the filter result corresponding to the first predefined region.

In some implementations, the plurality of identifiers includes a source internet protocol address and a destination internet protocol address. In some implementations, the filter analyzer is further configured to convert the value of said extracted identifier to a second value within a predetermined linear range for the identifier. In a further implementation, the filter analyzer is further configured to identify the position within the spatial map corresponding to the value of the extracted plurality of identifiers by generating a point at coordinates of a converted value for a first identifier of the extracted plurality of identifiers by a converted value for a second identifier of the extracted plurality of identifiers.

In some implementations, determining that the identified position is within the first predefined region by generating a database query, by the filter analyzer, comprising an identification of a boundary of the first predefined region and the identified position. In a further implementation, the identification of the boundary of the first predefined region comprises a minimum bounding rectangle.

In some implementations, the filter result corresponding to the first predefined region comprises a blocking rule, and the packet processing engine is further configured to prevent forwarding of the packet by the packet processing engine to the second computing device. In other implementations, the filter result corresponding to the first predefined region comprises a redirection rule, and the packet processing engine is further configured to forward the packet to a third computing device. In still other implementations, the filter result corresponding to the first predefined region comprises a modification rule, and the packet processing engine is further configured to: rewrite a portion of the packet; and forward the packet to the second computing device.

In some implementations, the network interface is further configured to receive a second packet from a third computing device of the plurality of computing devices and directed to a second computing device of the plurality of computing devices. The packet processing engine is further configured to extract a second plurality of identifiers of the second packet. The filter analyzer is further configured to identify a second position within the spatial map corresponding to a value of the extracted second plurality of identifiers, and determine that the identified second position is external to the at least one predefined regions. The packet processing engine is further configured to forward the packet to the fourth computing device, responsive to the determination.

Figure 4:
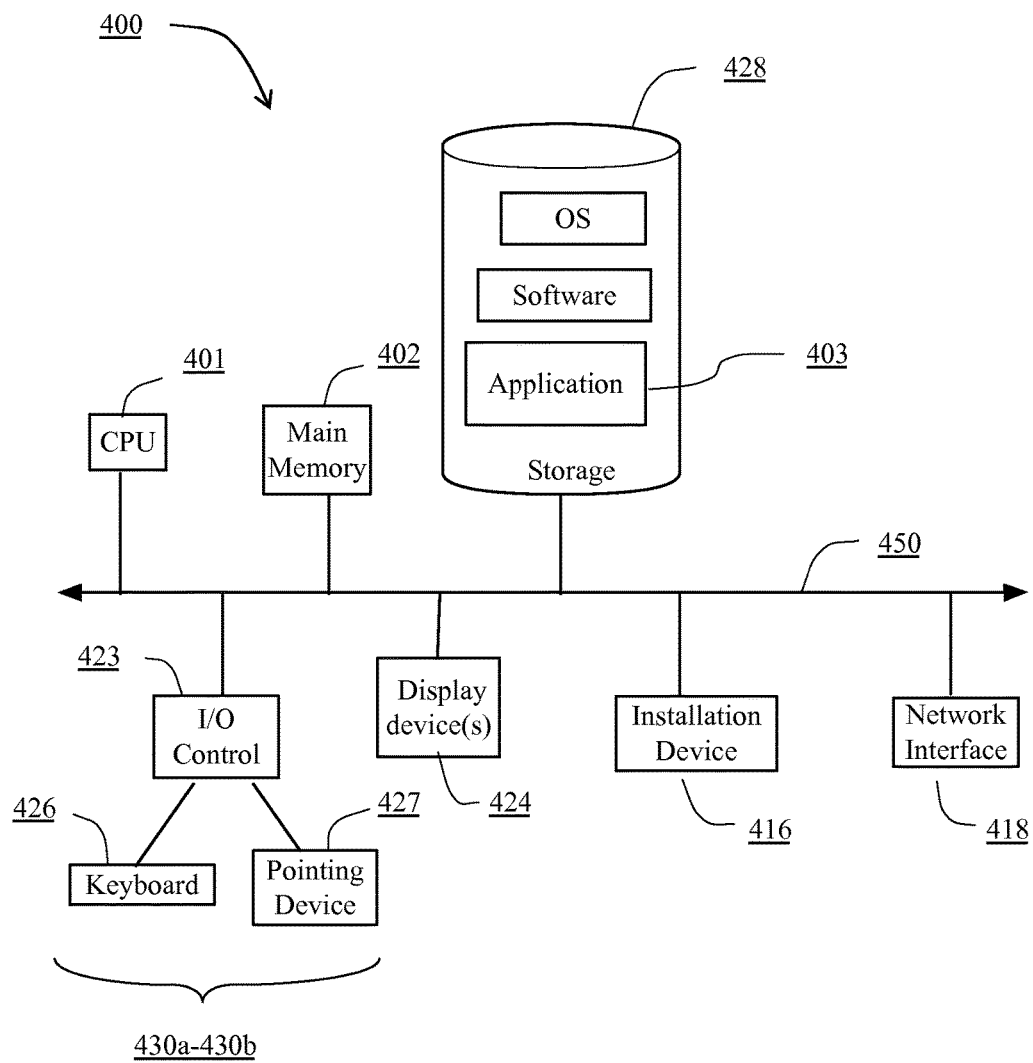
FIG. 4 is a block diagram of an exemplary computing device useful for practicing the methods and systems described herein.

FIG. 4 is a block diagram of an exemplary computing device useful for practicing the methods and systems described herein. The various devices 100, 102 may be deployed as and/or executed on any type and form of computing device, such as a computer, network device or appliance capable of communicating on any type and form of network and performing the operations described herein. The computing device may comprise a laptop computer, desktop computer, virtual machine executed by a physical computer, tablet computer, such as an iPad tablet manufactured by Apple Inc. or Android-based tablet such as those manufactured by Samsung, Inc. or Motorola, Inc., smart phone or PDA such as an iPhone-brand/iOS-based smart phone manufactured by Apple Inc., Android-based smart phone such as a Samsung Galaxy or HTC Droid smart phone, or any other type and form of computing device. FIG. 4 depicts a block diagram of a computing device 400 useful for practicing an embodiment of the media sources, streaming servers, controllers, and/or client devices discussed above. A computing device 400 may include a central processing unit 401; a main memory unit 402; a visual display device 424; one or more input/output devices 430a-430b (generally referred to using reference numeral 430), such as a keyboard 426, which may be a virtual keyboard or a physical keyboard, and/or a pointing device 427, such as a mouse, touchpad, or capacitive or resistive single- or multi-touch input device; and a cache memory 440 in communication with the central processing unit 401.

The central processing unit 401 is any logic circuitry that responds to and processes instructions fetched from the main memory unit 402 and/or storage 428. The central processing unit may be provided by a microprocessor unit, such as: those manufactured by Intel Corporation of Santa Clara, Calif.; those manufactured by Motorola Corporation of Schaumburg, Ill.; those manufactured by Apple Inc. of Cupertino Calif., or any other single- or multi-core processor, or any other processor capable of operating as described herein, or a combination of two or more single- or multi-core processors. Main memory unit 402 may be one or more memory chips capable of storing data and allowing any storage location to be directly accessed by the microprocessor 401, such as random access memory (RAM) of any type. In some embodiments, main memory unit 402 may include cache memory or other types of memory.

The computing device 400 may support any suitable installation device 416, such as a floppy disk drive, a CD-ROM drive, a CD-R/RW drive, a DVD-ROM drive, tape drives of various formats, USB/Flash devices, a hard-drive or any other device suitable for installing software and programs such as any client agent, host agent, server, application 403, or portion thereof. The computing device 400 may further comprise a storage device 428, such as one or more hard disk drives or redundant arrays of independent disks, for storing an operating system and other related software, and for storing application software programs.

Furthermore, the computing device 400 may include a network interface 418 to interface to a Local Area Network (LAN), Wide Area Network (WAN) or the Internet through a variety of connections including, but not limited to, standard telephone lines, LAN or WAN links (e.g., Ethernet, T1, T3, 56 kb, X.25), broadband connections (e.g., ISDN, Frame Relay, ATM), wireless connections, (802.11a/b/g/n/ac, BlueTooth), cellular connections, or some combination of any or all of the above. The network interface 418 may comprise a built-in network adapter, network interface card, PCMCIA network card, card bus network adapter, wireless network adapter, USB network adapter, cellular modem or any other device suitable for interfacing the computing device 400 to any type of network capable of communication and performing the operations described herein.

A wide variety of I/O devices 430a-430n may be present in the computing device 400. Input devices include keyboards, mice, trackpads, trackballs, microphones, drawing tablets, and single- or multi-touch screens. Output devices include video displays, speakers, headphones, inkjet printers, laser printers, and dye-sublimation printers. The I/O devices 430 may be controlled by an I/O controller 423 as shown in FIG. 4. The I/O controller may control one or more I/O devices such as a keyboard 426 and a pointing device 427, e.g., a mouse, optical pen, or multi-touch screen. Furthermore, an I/O device may also provide storage 428 and/or an installation medium 416 for the computing device 400. The computing device 400 may provide USB connections to receive handheld USB storage devices such as the USB Flash Drive line of devices manufactured by Twintech Industry, Inc. of Los Alamitos, Calif.

The computing device 400 may comprise or be connected to multiple display devices 424a-424n, which each may be of the same or different type and/or form. As such, any of the I/O devices 430a-430n and/or the I/O controller 423 may comprise any type and/or form of suitable hardware, software embodied on a tangible medium, or combination of hardware and software to support, enable or provide for the connection and use of multiple display devices 424a-424n by the computing device 400. For example, the computing device 400 may include any type and/or form of video adapter, video card, driver, and/or library to interface, communicate, connect or otherwise use the display devices 424a-424n. A video adapter may comprise multiple connectors to interface to multiple display devices 424a-424n. The computing device 400 may include multiple video adapters, with each video adapter connected to one or more of the display devices 424a-424n. Any portion of the operating system of the computing device 400 may be configured for using multiple displays 424a-424n. Additionally, one or more of the display devices 424a-424n may be provided by one or more other computing devices, such as computing devices 400a and 400b connected to the computing device 400, for example, via a network. These embodiments may include any type of software embodied on a tangible medium designed and constructed to use another computer's display device as a second display device 424a for the computing device 400. One ordinarily skilled in the art will recognize and appreciate the various ways and embodiments that a computing device 400 may be configured to have multiple display devices 424a-424n.

A computing device 400 of the sort depicted in FIG. 4 typically operates under the control of an operating system, such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein.

The computing device 400 may have different processors, operating systems, and input devices consistent with the device. For example, in one embodiment, the computer 400 is an Apple iPhone or Motorola Droid smart phone, or an Apple iPad or Samsung Galaxy Tab tablet computer, incorporating multi-input touch screens. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software embodied on a tangible medium, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

What is claimed:

1. A method for geoprocessing-based computing network security, comprising:

receiving, by a network interface of a security device deployed as an intermediary between a plurality of computing devices, a first packet from a first computing device of the plurality of computing devices directed to a second computing device of the plurality of computing devices;

extracting, by a packet processing engine of the security device, a plurality of identifiers of the first packet;

identifying, by a filter analyzer of the security device, a position within a spatial map corresponding to a value of the extracted plurality of identifiers, the spatial map comprising at least one predefined region, each predefined region corresponding to a filter condition and result, the identifying comprising:
for each of the extracted plurality of identifiers, converting, by the filter analyzer, the value of said extracted identifier to a second value within a predetermined linear range for the identifier, and
generating a point at coordinates of a converted value for a first identifier of the extracted plurality of identifiers by a converted value for a second identifier of the extracted plurality of identifiers;
determining, by the filter analyzer, that the identified position is within a first predefined region of the at least one predefined regions; and
responsive to the determination, filtering the first packet, by the packet processing engine, according to the filter result corresponding to the first predefined region.

2. The method of claim 1, wherein the plurality of identifiers comprises a source internet protocol address and a destination internet protocol address.

3. The method of claim 1, wherein determining that the identified position is within the first predefined region further comprises generating a database query, by the filter analyzer, comprising an identification of a boundary of the first predefined region and the identified position.

4. The method of claim 3, wherein the identification of the boundary of the first predefined region comprises a minimum bounding rectangle.

5. The method of claim 1, wherein the filter result corresponding to the first predefined region comprises a blocking rule, and wherein filtering the first packet comprises preventing forwarding of the first packet by the packet processing engine to the second computing device.

6. The method of claim 1, wherein the filter result corresponding to the first predefined region comprises a redirection rule, and wherein filtering the first packet comprises forwarding the first packet by the packet processing engine to a third computing device.

7. The method of claim 1, wherein the filter result corresponding to the first predefined region comprises a modification rule, and wherein filtering the first packet comprises:
rewriting, by the packet processing engine, a portion of the first packet; and
forwarding the first packet, by the packet processing engine, to the second computing device.

8. The method of claim 1, further comprising:
receiving, by the network interface of the security device, a second packet from a third computing device of the plurality of computing devices directed to a second computing device of the plurality of computing devices;
extracting, by the packet processing engine, a second plurality of identifiers of the second packet;
identifying, by the filter analyzer, a second position within the spatial map corresponding to a value of the extracted second plurality of identifiers;
determining, by the filter analyzer, that the identified second position is external to the at least one predefined regions; and
responsive to the determination, forwarding the second packet, by the packet processing engine, to the fourth computing device.

9. A system for geoprocessing-based computing network security, comprising:
a security device deployed as an intermediary between a plurality of computing devices comprising a network interface, a memory device, and a processor executing a packet processing engine and a filter analyzer;
wherein the network interface is configured to receive a first packet from a first computing device of the plurality of computing devices directed to a second computing device of the plurality of computing devices;
wherein the packet processing engine of the security device is configured to extract a plurality of identifiers of the first packet;
wherein the filter analyzer of the security device is configured to:
identify a position within a spatial map stored in the memory device corresponding to a value of the extracted plurality of identifiers, the spatial map comprising at least one predefined region, each predefined region corresponding to a filter condition and result,
convert the value of said extracted identifier to a second value within a predetermined linear range for the identifier,
generate a point at coordinates of a converted value for a first identifier of the extracted plurality of identifiers by a converted value for a second identifier of the extracted plurality of identifiers, and
determine that the identified position is within a first predefined region of the at least one predefined regions; and
wherein the packet processing engine is further configured to filter the first packet, responsive to the determination, according to the filter result corresponding to the first predefined region.

10. The system of claim 9, wherein the plurality of identifiers comprises a source internet protocol address and a destination internet protocol address.

11. The system of claim 9, wherein determining that the identified position is within the first predefined region by generating a database query, by the filter analyzer, comprising an identification of a boundary of the first predefined region and the identified position.

12. The system of claim 11, wherein the identification of the boundary of the first predefined region comprises a minimum bounding rectangle.

13. The system of claim 9, wherein the filter result corresponding to the first predefined region comprises a blocking rule, and the packet processing engine is further configured to prevent forwarding of the first packet by the packet processing engine to the second computing device.

14. The system of claim 9, wherein the filter result corresponding to the first predefined region comprises a redirection rule, and the packet processing engine is further configured to forward the first packet to a third computing device.

15. The system of claim 9, wherein the filter result corresponding to the first predefined region comprises a modification rule, and the packet processing engine is further configured to:
rewrite a portion of the first packet; and
forward the first packet to the second computing device.

16. The system of claim 9, wherein the network interface is further configured to receive a second packet from a third computing device of the plurality of computing devices and directed to a second computing device of the plurality of computing devices;
wherein the packet processing engine is further configured to extract a second plurality of identifiers of the second packet;

wherein the filter analyzer is further configured to identify a second position within the spatial map corresponding to a value of the extracted second plurality of identifiers, and determine that the identified second position is external to the at least one predefined regions; and wherein the packet processing engine is further configured to forward the second packet to the fourth computing device, responsive to the determination.

\* \* \* \* \*